(12) United States Patent
Natale

(10) Patent No.: US 11,712,941 B2
(45) Date of Patent: Aug. 1, 2023

(54) VEHICLE INTERIOR PANEL WITH THERMOELECTRIC AIR CONDITIONING

(71) Applicant: Faurecia Interior Systems, Inc., Auburn Hills, MI (US)

(72) Inventor: Nicholas Natale, Sterling Heights, MI (US)

(73) Assignee: Faurecia Interior Systems, Inc., Auburn Hills, MI (US)

(*) Notice: Subject to any disclaimer, the term of this patent is extended or adjusted under 35 U.S.C. 154(b) by 695 days.

(21) Appl. No.: 16/539,374

(22) Filed: Aug. 13, 2019

(65) Prior Publication Data
US 2021/0046798 A1 Feb. 18, 2021

(51) Int. Cl.
*B60H 1/00* (2006.01)

(52) U.S. Cl.
CPC ..... *B60H 1/00295* (2019.05); *B60H 1/00207* (2013.01); *B60H 1/00478* (2013.01); *B60H 1/00821* (2013.01); *B60H 2001/003* (2013.01); *B60H 2001/00221* (2013.01); *B60H 2001/00228* (2013.01)

(58) Field of Classification Search
CPC ............ B60H 1/00295; B60H 1/00207; B60H 1/00478; B60H 1/00821; B60H 2001/00221; B60H 2001/00228; B60H 2001/003
USPC ...................................... 454/143
See application file for complete search history.

(56) References Cited

U.S. PATENT DOCUMENTS

| | | | |
|---|---|---|---|
| 5,450,894 A * | 9/1995 | Inoue | B60H 1/00664 165/43 |
| 7,434,608 B2 * | 10/2008 | Shindo | B60H 1/00207 165/41 |
| 2005/0067158 A1 * | 3/2005 | Ito | B60H 1/00885 165/204 |
| 2017/0217284 A1 | 8/2017 | Ji et al. | |

FOREIGN PATENT DOCUMENTS

| | | |
|---|---|---|
| DE | 4207283 A1 | 9/1993 |
| FR | 2865436 A1 | 7/2005 |
| FR | 2902700 A1 | 12/2007 |
| GB | 2327148 A | 1/1999 |
| KR | 20120064910 A | 6/2012 |

(Continued)

OTHER PUBLICATIONS

Sung, Tae Soo/Jun, Duck Jae, KR20120064910 Translation.pdf, "One body tpe air conditioner for vehicle", Jun. 2012, pp. 1-13.*

(Continued)

*Primary Examiner* — Michael G Hoang
*Assistant Examiner* — Ryan L Faulkner
(74) *Attorney, Agent, or Firm* — Reising Ethington P.C.

(57) ABSTRACT

A vehicle interior panel includes a thermoelectric air conditioner capable of providing conditioned air locally within a passenger cabin of the vehicle. Air is drawn from the passenger cabin through an intake port in the panel, conditioned locally along a back side of the panel by a thermoelectric device, and discharged back into the cabin through a discharge port in the panel. Additional air flows along a waste side of the thermoelectric device and can be discharged outside the passenger cabin. The panel can be an interior door panel from which the waste side air is discharged within a B-pillar of the vehicle body.

17 Claims, 3 Drawing Sheets

(56) References Cited

FOREIGN PATENT DOCUMENTS

| KR | 20150113630 A | 10/2015 |
|---|---|---|
| KR | 20180061726 A | 6/2018 |
| KR | 101946520 B1 | 2/2019 |
| WO | 2020065284 A1 | 4/2020 |

OTHER PUBLICATIONS

European Search Report corresponding to European Application No. EP 20 18 7648, dated Jan. 19, 2021, 8 pages.
European Office Action corresponding to European Application No. 20 187 648.9, dated Dec. 23, 2021, 6 pages.

\* cited by examiner

VEHICLE INTERIOR PANEL WITH THERMOELECTRIC AIR CONDITIONING

TECHNICAL FIELD

The present disclosure is related generally to vehicle interior panels and, more particularly, to vehicle interior panels with an air conditioning function.

BACKGROUND

Conventional vehicle HVAC systems rely on a central blower system to circulate air in the passenger cabin. Air is drawn from outside the vehicle or from within the passenger cabin and flows along a centralized heat exchanger to heat or cool the air before sending it to the passenger cabin. The centralized heat exchanger is typically a heater core through which hot vehicle engine coolant flows or an evaporator coil through which a compressible refrigerant flows. A problem with such systems is their limited ability to heat or cool areas of the passenger cabin remote from the centralized heat exchanger and blower, such as the rear seating area of a front-engine vehicle. To effectively reach remote areas of the passenger cabin, the blower must be capable of volumetric flow rates much higher than are necessary to reach the front seating area alone. The problem is compounded with the advent of electric and hybrid vehicles, in which electrical energy must be conserved to a greater extent and in which conventional engine-powered air-conditioning compressors and engine cooling systems may not be present.

KR 2015-0113630 by Dong et al. discloses a vehicle cabin heating and cooling system that discharges air along surfaces that vehicle passengers come into contact with, such as armrests, gear-shifting knobs, and window ledges. One example includes a supplementary heat exchange module built into a vehicle door. However, as with the above-described conventional system, the Dong system relies mainly on a centralized blower of the vehicle HVAC system to force air from the front of the vehicle to the rear of the passenger cabin.

SUMMARY

An illustrative vehicle interior panel includes a thermoelectric air conditioner configured to move air from a vehicle passenger cabin along a first side of a thermoelectric device to change the temperature of the air before discharging the air back into the passenger cabin. The thermoelectric air conditioner is also configured to move additional air along an opposite second side of the thermoelectric device and discharge the additional air to a location outside the passenger cabin. The amount of air moved along the first side is separately controllable from the amount of air moved along the second side.

In various embodiments, the vehicle interior panel includes a first air mover operable to move the air along the first side of the thermoelectric device and a second air mover operable to move the additional air along the second side of the thermoelectric device.

In various embodiments, the vehicle interior panel includes a conditioning duct along which the air moves along the first side of the thermoelectric device and a separate waste duct along which the additional air moves along the second side of the thermoelectric device.

In various embodiments, the vehicle interior panel includes an intake port through which air from the passenger cabin enters a conditioning duct and a discharge port through which air is discharged from the conditioning duct back into the passenger cabin.

In various embodiments, the vehicle interior panel includes an intake port through which the additional air enters a waste duct and a discharge port through which the additional air is discharged from the waste duct to the location outside the passenger cabin.

In various embodiments, the additional air moved along the second side of the thermoelectric device is drawn from the passenger cabin.

In various embodiments, the location outside the passenger cabin is within a hollow portion of a structural member of a body of the vehicle.

In various embodiments, the panel is an interior door panel and the location outside the passenger cabin is within a hollow portion of a B-pillar of a body of the vehicle.

In various embodiments, the vehicle interior panel includes a temperature sensor positioned downstream from the thermoelectric device to sense the temperature of the air before the air is discharged back into the passenger cabin.

In various embodiments, the thermoelectric air conditioner is configured to communicate with a controller that receives air temperature information from the air conditioner and controls the air conditioner based on the air temperature information.

In various embodiments, wherein a controller receives temperature setpoint information and controls the air conditioner based on the setpoint information.

In various embodiments, the thermoelectric device includes a first heat sink at the first side and a second heat sink at the second side. The first heat sink extends into a conditioning duct having opposite ends with respective ports connecting the conditioning duct with the passenger cabin. The second heat sink extends into a waste duct such that the conditioning and waste ducts are interconnected by the thermoelectric device.

In various embodiments, the thermoelectric air conditioner includes a conditioning duct, a first air mover, a waste duct, and a second air mover. The conditioning duct has an intake end and a discharge end. The first air mover is positioned along the conditioning duct to draw air from the passenger cabin through an intake port at the intake end, move the air along a first heat sink of the thermoelectric device positioned in the conditioning duct, and discharge the air back into the passenger cabin through a discharge port at the discharge end. The waste duct also has an intake end and a discharge end. The second air mover is positioned along the waste duct to draw the additional air through an intake port at the intake end of the waste duct, move the additional air along a second heat sink of the thermoelectric device positioned in the waste duct, and discharge the additional air through a discharge port at the discharge end of the waste duct. The first and second air movers are separately controllable.

In various embodiments, the additional air drawn through an intake port at an intake end of a waste duct of the air conditioner is drawn from the passenger cabin.

In various embodiments, the vehicle interior panel is an interior door panel and a discharge port at a discharge end of a waste duct of the air conditioner is formed through a side wall of the door panel.

It is contemplated than any of the above-listed features can be combined with any other feature or features of the above-described embodiments or the features described below and/or depicted in the drawings, except where there is an incompatibility of features.

BRIEF DESCRIPTION OF THE DRAWINGS

Illustrative embodiments will hereinafter be described in conjunction with the following figures, wherein like numerals denote like elements, and wherein.

DESCRIPTION OF ILLUSTRATIVE EMBODIMENTS

Described below is a vehicle interior panel capable of providing conditioned air locally within a passenger cabin of the vehicle. Air can be drawn from the passenger cabin through a portion of the panel, conditioned along the back of the panel by a thermoelectric device, and discharged back into the cabin through the same panel. Additional and separately controllable air can flow along a waste side of the thermoelectric device to be discharged outside the passenger cabin. In the examples described below, the panel is an interior door panel from which the waste side air is discharged within a B-pillar of the vehicle body. However, the following teachings are applicable to other vehicle interior panels, such as instrument panels, seat panels, roof panels, steering wheel panels, console panels, etc., and waste side air can be discharged elsewhere, such as outside the vehicle or to a different part of the vehicle in need of heating or cooling.

Figure 1:
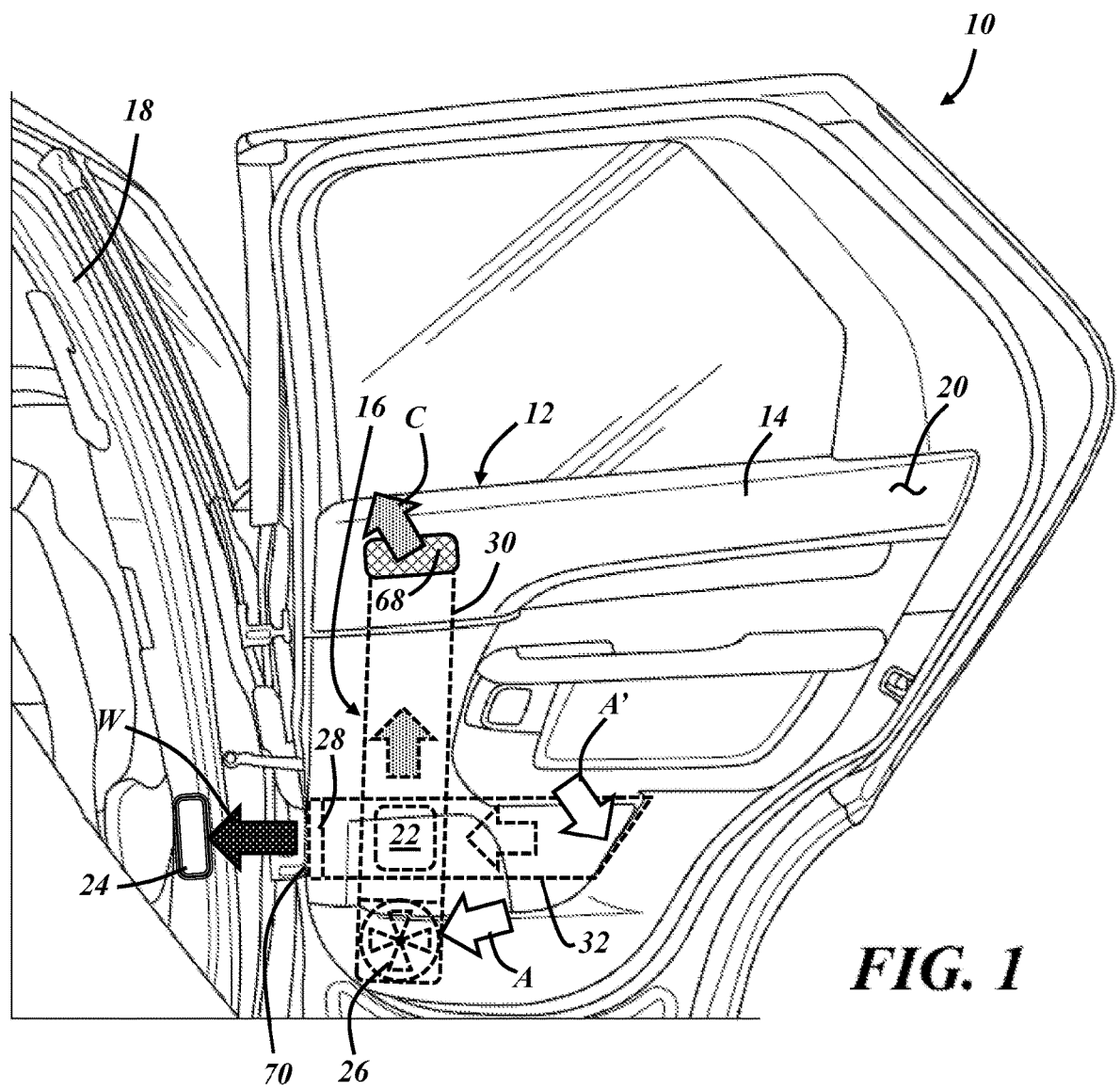
FIG. 1 is a view of the interior side of an open vehicle door that includes an exemplary vehicle interior panel including a thermoelectric air conditioner.

FIG. 1 is a view of the interior side of an open vehicle door 10 that includes an exemplary vehicle interior panel 12 including a trim piece 14 and a thermoelectric air conditioner 16. The vehicle door 10 includes a metal or composite structural frame to which the interior panel 12 is attached on one side and to which an exterior body panel is attached on the opposite side. The door 10 is attached via hinges to a structural body of the vehicle, also referred to as the body-in-white (BIW). The door 10 of FIG. 1 is a rear door affixed to a B-pillar 18 of the vehicle body. The B-pillar is a structural member extending between the floor and the roof of the vehicle body and between front and rear door openings of the vehicle body. On a vehicle with forward-hinged doors, the front side of the rear door may be hinged to one side of the B-pillar, as in FIG. 1, and the rear side of the front door may be latched to the opposite side of the B-pillar.

In this example, the thermoelectric air conditioner 16 is located in a hollow space between the trim piece 14 and the exterior door panel. Utilitarian components such as a window regulator, an audio speaker, a door latch mechanism, electrical wiring, etc. are also housed in this hollow space. The thermoelectric air conditioner 16 is located along a back side of the trim piece 14 which is opposite a decorative side 20 that faces and defines a portion of the passenger cabin when the door is closed. The air conditioner 16 can be affixed to one or both of the trim piece 14 and the structural portion of the door 10 by fasteners or any other suitable means.

The trim piece 14 of the panel 12 may be a multilayer piece including, for example, an injection molded substrate that generally defines the shape of the panel, and one or more overlying decorative coverings that provide the aesthetic look and feel of the panel 12. The trim piece 14 conceals the hollow interior of the door 10 and its contents from view and can itself be constructed as one or more pieces assembled together. The trim piece 14 of FIG. 1 is a lower trim piece that extends vertically between a bottom side of the door 10 and the bottom of the window opening and lengthwise between front and rear sides of the door. An upper trim piece may trim out the window opening or be made as one piece with the lower trim piece.

Central to the operation of the thermoelectric air conditioner 16 is a thermoelectric device 22. The thermoelectric device 22 is a solid-state electrically powered component that operates according to the Peltier effect in which a heat flux is created at the junction between certain different types of materials—usually semiconductors—when an electric current crosses the junction. The direction of the heat flux depends on the direction of the current flow across the junction. One side of the thermoelectric device (or TED) thus increases in temperature, while the opposite side decreases in temperature when a DC voltage is applied. The heated and cooled sides are reversed when the polarity of the DC voltage is reversed. The TED 22 requires no liquid/vapor refrigerant, compressor, condenser, or evaporator and can therefore be located anywhere a DC voltage is available to power it.

The thermoelectric air conditioner 16 is configured to move air (A) from the vehicle passenger cabin along a first side of the thermoelectric device 22 to change the temperature of the air before discharging the air back into the passenger cabin as conditioned air (C). As used here, "conditioned" means heated or cooled relative to the air temperature before moving along the TED 22, and an "air conditioner" is thus an air heater and/or an air cooler. The thermoelectric air conditioner 16 is also configured to move additional air (A') along an opposite second side of the thermoelectric device 22 and discharge the additional air as waste air (W) to a location outside the passenger cabin. In this example, the waste air is discharged into a hollow portion of the B-pillar 18 via a port 24 formed through a B-pillar trim piece. The amount of air moved along the first side of the TED 22 may be separately controllable from the amount of air moved along the second side of the TED by the provision of separate first and second air movers 26, 28.

Figure 2:
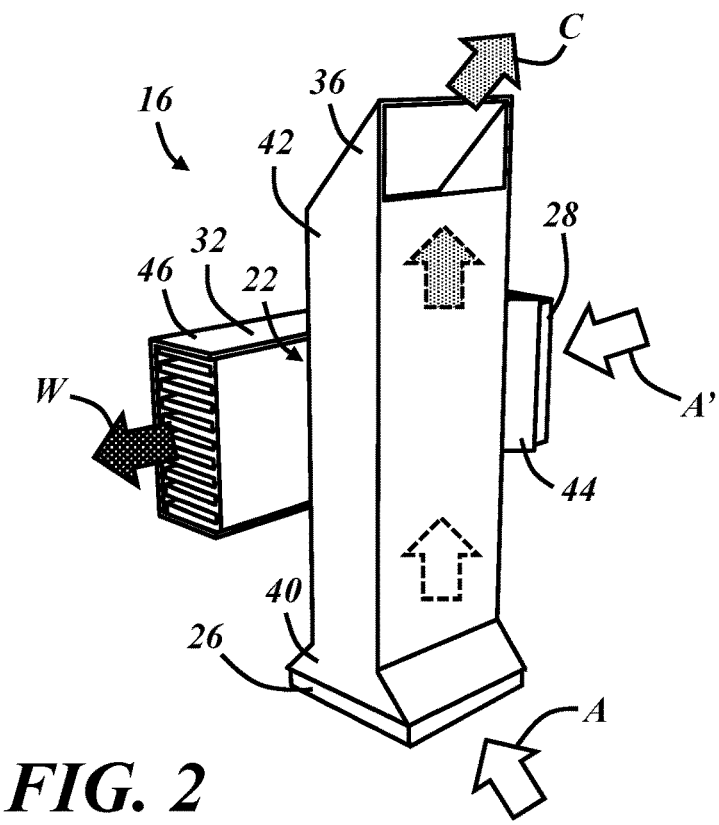
FIG. 2 is a perspective view of the thermoelectric air conditioner without a concealing trim piece.
Figure 3:
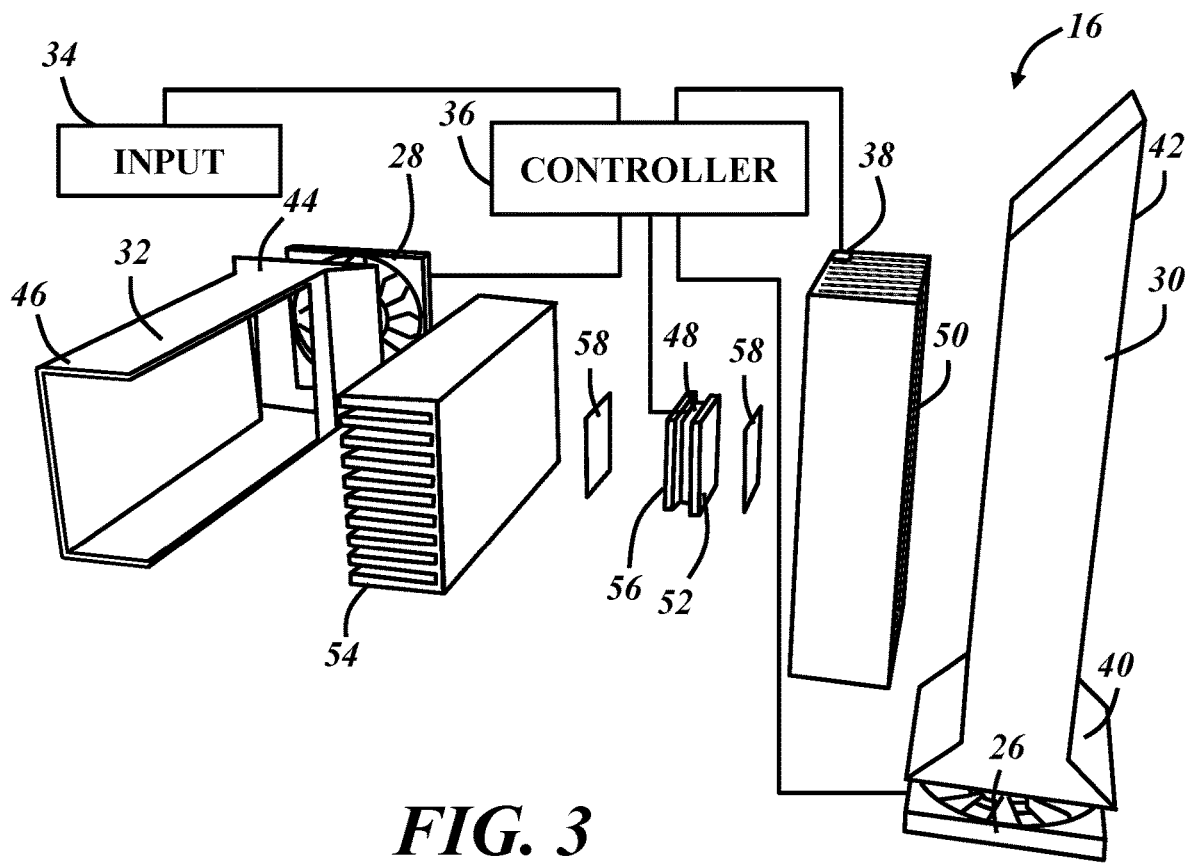
FIG. 3 is an exploded view of the thermoelectric air conditioner of FIG. 2.

FIG. 2 is a perspective view of an example of the thermoelectric air conditioner 16 similar in configuration with that of FIG. 1, shown separately from the trim piece 14 of the panel 12, and FIG. 3 is an exploded view of the air conditioner of FIG. 2. The illustrated air conditioner 16 includes the aforementioned first and second air movers 26, 28, along with a conditioning duct 30, a separate waste duct 32, an input device 34, and a controller 36. The input device 34 is any component operable to provide temperature set-point information to the controller 36, such as a user interface (e.g., switch or panel) or another vehicle control module that receives or calculates the set-point information to provide to the controller. The controller 36 is configured to receive information from the input device 34 along with information from a temperature sensor 38 and to control the TED 22, the first air mover 26, and/or the second air mover 28 based on the received information. The controller may, for example, increase or decrease power to the air movers 26, 28 to change the volumetric flow of air in each duct 30, 32. The controller 36 may also increase or decrease power to or change the polarity of the voltage to the TED 22 based on the received information. The controller 36 can be integrated as part of the air conditioner 16 and dedicated solely to the air conditioner or it may be a central controller for the vehicle or for a vehicle subsystem (e.g., an HVAC system). The temperature sensor 38 may be a thermocouple, thermistor, IR-sensor, or any other suitable sensor.

The air conditioner 16 of FIGS. 2 and 3 is generally oriented as in FIG. 1, with the air (A) to be conditioned entering from the bottom and being discharged from the top, and with the additional air (A') moving in a direction from the rear side of the door toward the front side of the door at the B-pillar. Other orientations are possible. The conditioning duct 30 has an intake end 40 and an opposite discharge end 42. In this example, the first air mover 26 is a fan located at the intake end 40 of the duct 30. Other types of air movers can be employed and may be positioned elsewhere, such as at the discharge end 42 or between the intake and discharge ends. The air mover 26 need only create a pressure differential or otherwise cause the air to move in the desired direction along the duct 30. In the example of FIG. 1, the first air mover 26 is also located at the intake end of the conditioning duct 30 but is oriented vertically to draw passenger cabin air into the duct through a port formed through a hidden map pocket portion of the trim piece 14.

Similarly, the waste duct 32 has an intake end 44 and an opposite discharge end 46. The second air mover 28 may be a fan located at the intake end 44 of the duct 32 as in FIGS. 2 and 3, or it may be any other type of air mover located elsewhere and operable to move the additional air A' in the desired direction along the duct 32. In the example of FIG. 1, for instance, the second air mover 28 is located at the discharge end of the waste duct 32.

The thermoelectric device 22 is located at a junction of the conditioning duct 30 and the waste duct 32 effectively interconnects the ducts as an assembly. The TED 22 includes a base thermoelectric unit 48 to which the DC voltage is applied to create the temperature differential. A first side of the TED 22 includes a first heat sink 50 bonded to one side 52 of the thermoelectric unit 48, and a second side of the TED includes a second heat sink 54 bonded to an opposite side 56 of the thermoelectric unit. Thermal bonding layers 58 (e.g., thermally conductive paste or tape) are interposed between the thermoelectric unit 48 and the heat sinks 50, 54 to ensure full thermal contact at the interfaces. The first heat sink 50 is disposed in the conditioning duct 30, and the second heat sink 54 is disposed in the waste duct 32.

In the illustrated example, the back side of each heat sink 50, 54 effectively forms a wall of the respective duct 30, 32 in which it is housed. The back sides of the heat sinks 50, 54 face each other and are separated by the thickness of the thermoelectric unit 48. A thermally insulating layer of material (not shown) such as EPS or polyurethane foam may be interposed between the two heat sinks 50, 54 and around the perimeter of the thermoelectric unit 48 to thermally isolate the opposite sides of the TED 22 from one another. In some embodiments, multiple thermoelectric units 48 may be sandwiched between the heat sinks or otherwise be thermally connected with the heat sinks. The heating and/or cooling capacity of the air conditioner may be a function of the number of included TEDs 22 or thermoelectric units 48.

Each of the illustrated heat sinks 50, 54 is formed from a thermally conductive material (e.g., an aluminum alloy) and has a series of fins that protrude into and across the inside of the respective duct 30, 32. The fins are elongated in the direction of air flow and separated by gaps elongated in the same direction. Other configurations are possible. Each heat sink 50, 54 functions to quickly transfer thermal energy between the thermoelectric unit 48 and the air in the respective duct 30, 32. The relatively large surface area of the fins promotes forced convective energy transfer with the flowing air, while the flat full-contact surface on the back side of each heat sink promotes conductive energy transfer with the thermoelectric unit 48.

In a cooling mode of the air conditioner 16, a DC voltage is applied to the thermoelectric unit 48 with a polarity that induces a heat flux from the first side 52 to the second side 56 of the unit 48. Thermal energy thus flows from the first heat sink 50 to the second heat sink 54, which accordingly tend to respectively decrease and increase in temperature. Air (A) from the passenger cabin flows along the first heat sink 50 under the influence of the first air mover 26, the heat sink 50 absorbs thermal energy from the air in the duct 30 until there is no longer a temperature differential between the air in the duct and the heat sink. When the passenger cabin is hot, as is the typically the case when the air conditioner 16 is first placed into the cooling mode, there is a continuous flow of heat from the air in the conditioning duct 30 to the heat sink 50 and through the thermoelectric unit 48 to the other heat sink 54. The conditioned air (C) discharged back into the cabin thus has less thermal energy than the air (A) drawn into the conditioning duct 30 as long as the thermal energy flow through the thermoelectric unit 48 is maintained.

The second air mover 28, waste duct 32, and second heat sink 54 work together to maintain that thermal energy flow by extracting thermal energy from the second side 56 of the thermoelectric unit 48. The second heat sink 54 absorbs thermal energy from the thermoelectric unit 48, and the additional air (A') flowing along the waste duct 32 extracts thermal energy from the heat sink 54 to create the waste air (W), which is hotter than the air drawn into the intake end 44 of the waste duct. Without the waste duct 32, second air mover 28, and second heat sink 54, the second side 56 of the thermoelectric unit 48 would eventually be hotter than the first side 52 by a sufficient amount to prevent thermal energy flow from the first to second side.

While TEDs may be more commonly used as cooling devices, the air conditioner 16 may also operate in a heating mode by reversing the polarity of the DC voltage from the cooling mode. In that case, the presumably cold air from the passenger cabin is drawn across the hot side of the TED 22 and absorbs thermal energy before being discharged back into the passenger cabin. In some cases, the second air mover 28 may be turned off in the heating mode.

In the illustrated embodiments, the first and second air movers 26, 28 may be separately controllable by the controller 36 to independently switch them off and on and/or or control their respective speeds or effective flow rates. Another way of separately controlling the air flowing along the conditioning duct from the additional air flowing along the waste duct is via controlling a damper or flapper valve. In that case, a single air mover may be employed to draw air into the air conditioner through a common air intake port before the intake air is separated into the separate conditioning and waste ducts with the valve at the separation point. The air to be conditioned flows into the conditioning duct 30, and the remainder of the intake air becomes the additional air that flows along the waste duct 32.

Figure 4:
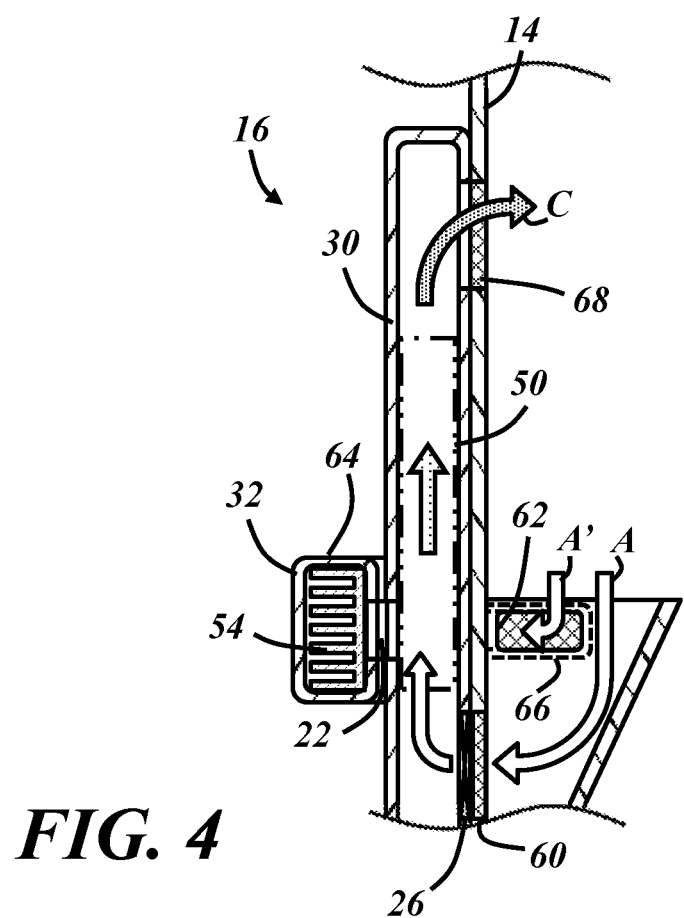
FIG. 4 is a vertical cross-sectional view taken through the thermoelectric air conditioner illustrating air intake ports along a map pocket of the interior door panel and a discharge port along an upper portion of the panel.

In the example of FIG. 1, the air in the two separate ducts 30, 32 is drawn into the air conditioner 16 at two separate locations. FIG. 4 is a vertical cross-sectional view taken through the TED 22 of a similar configuration to that of FIG. 1. In particular, the air (A) is drawn into the conditioning duct 30 from the passenger cabin under the influence of the first air mover 26 through a first intake port 60 formed through the trim piece 14, and the additional air (A') is drawn into the waste duct 32 from the passenger cabin under the influence of the second air mover through a second intake port 62, also formed through the trim piece 14. The first intake port 60 is located along an outboard wall of a map pocket of the door panel and is thus partly hidden from view by an inboard wall of the map pocket. The second intake port 62 is located along a forward-facing wall of the map pocket and is thus also partly hidden from view due to its orientation. Each intake port 60, 62 is depicted with a grille spanning the port which helps prevent foreign objects from entering the respective ducts.

The waste duct 32 in this example includes a main portion 64 extending in a direction between forward and rearward sides of the door (into and out of the page in FIG. 4). The second heat sink 54 is in the main portion 64 of the duct 32 in this example. A secondary portion 66 of the waste duct 32 interconnects the second intake port 62 with the main portion 64. Each duct 30, 32 may of course assume any shape—i.e., generally straight and rectangular ducts are shown here for simplicity in understanding the operation of the air conditioner 16. In some cases, the back side of the trim piece 14 defines at least a portion of a wall of one or both ducts.

In the example of FIG. 4, the first heat sink 50 is illustrated in phantom lines for simplicity to better show conversion of the air (A) drawn in through the first intake port 60 to the conditioned air (C) as it moves along the conditioning duct 30 and first heat sink 50 before eventually being discharged back into the passenger cabin through a discharge port 68 vertically above the corresponding intake port 60. The discharge port 68 is also formed through the trim piece 14 and depicted with a diffusing grille spanning the port. A similar discharge port is formed through the trim piece 14 at the discharge end of the waste duct 32 (not visible in FIG. 4). The discharge port through which the waste air is discharged to a hollow portion of the B-pillar, or to some other location outside the passenger cabin, may be formed along a side wall 70 of the trim piece 14 as shown in FIG. 1. This side wall 70 is not visible in the passenger cabin when the vehicle door 10 is closed and the waste discharge port is sealed together with the port 24 formed through the B-pillar trim piece. In other examples, the waste air (W) is discharged within the hollow portion of the vehicle door 10, such as on the opposite side of a thermally insulating panel that separates the heat sinks 50, 54 from each other.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A vehicle interior panel comprising a thermoelectric air conditioner configured to move air from a vehicle passenger cabin along a first side of a thermoelectric device to change the temperature of the air before discharging the air back into the passenger cabin, the thermoelectric air conditioner being further configured to move additional air along an opposite second side of the thermoelectric device and discharge the additional air to a location outside the passenger cabin, the vehicle interior panel further comprising a first air mover operable to move the air along the first side of the thermoelectric device and a second air mover operable to move the additional air along the second side of the thermoelectric device, wherein the first and second movers are separately controllable to be switched off and on, and to control their respective speeds or effective flow rates, and wherein the panel is an interior door panel and the additional air is discharged to said location outside the passenger cabin through a waste duct discharge port formed through a side wall of the door panel.

2. The vehicle interior panel of claim 1, further comprising a conditioning duct along which the air moves along the first side of the thermoelectric device and a separate waste duct along which the additional air moves along the second side of the thermoelectric device.

3. The vehicle interior panel of claim 2, further comprising a conditioning duct intake port through which air from the passenger cabin enters the conditioning duct and a conditioning duct discharge port through which air is discharged from the conditioning duct back into the passenger cabin.

4. The vehicle interior panel of claim 2, further comprising a waste duct intake port through which the additional air enters the waste duct.

5. The vehicle interior panel of claim 1, wherein the additional air moved along the second side of the thermoelectric device is drawn from the passenger cabin.

6. The vehicle interior panel of claim 1, wherein the location outside the passenger cabin is within a hollow portion of a structural member of a body of the vehicle.

7. The vehicle interior panel of claim 6, wherein the structural member is a B-pillar.

8. The vehicle interior panel of claim 1, further comprising a temperature sensor positioned downstream from the thermoelectric device to sense the temperature of the air before the air is discharged back into the passenger cabin.

9. The vehicle interior panel of claim 1, wherein the thermoelectric air conditioner is configured to communicate with a controller that receives air temperature information from the air conditioner and controls the air conditioner based on the air temperature information.

10. The vehicle interior panel of claim 9, wherein the controller receives temperature setpoint information and controls the air conditioner based on the setpoint information.

11. The vehicle interior panel of claim 1, wherein the thermoelectric device includes a first heat sink at the first side and a second heat sink at the second side, the first heat sink extending into a conditioning duct having opposite ends with a conditioning duct intake port and a conditioning duct discharge port connecting the conditioning duct with the passenger cabin, and the second heat sink extending into a waste duct such that the conditioning and waste ducts are interconnected by the thermoelectric device.

12. The vehicle interior panel of claim 1, wherein the air conditioner further comprises: a conditioning duct having an intake end and a discharge end, wherein the first air mover is positioned along the conditioning duct to draw air from the passenger cabin through an a conditioning duct intake port at the intake end of the conditioning duct, move the air along a first heat sink of the thermoelectric device positioned in the conditioning duct, and discharge the air back into the passenger cabin through a conditioning duct discharge port at the discharge end of the conditioning duct; and a waste duct having an intake end and a discharge end, wherein the second air mover positioned along the waste duct to draw the additional air through am a waste duct intake port at the intake end of the waste duct, move the additional air along a second heat sink of the thermoelectric device positioned in the waste duct, and discharge the additional air through a waste duct discharge port at the discharge end of the waste duct.

13. The vehicle interior panel of claim 12, wherein the additional air drawn through the waste duct intake port at the intake end of the waste duct is drawn from the passenger cabin.

14. The vehicle interior panel of claim 1, wherein the side wall is a vertical side wall.

15. The vehicle interior panel of claim 1, wherein the waste duct discharge port is formed through the side wall in a horizontal direction as mounted in a vehicle that includes the vehicle passenger cabin.

16. The vehicle interior panel of claim 1, further comprising a waste duct along which the additional air moves along the second side of the thermoelectric device, wherein the waste duct includes the waste duct discharge port and a main portion that extends in a direction between forward and rearward sides of the panel as mounted in a vehicle that includes the vehicle passenger cabin.

17. The vehicle interior panel of claim 1, wherein the side wall is not visible in the passenger cabin when a vehicle door including the panel is closed when mounted to a vehicle that includes the vehicle passenger cabin.

* * * * *